United States Patent Office 3,539,475
Patented Nov. 10, 1970

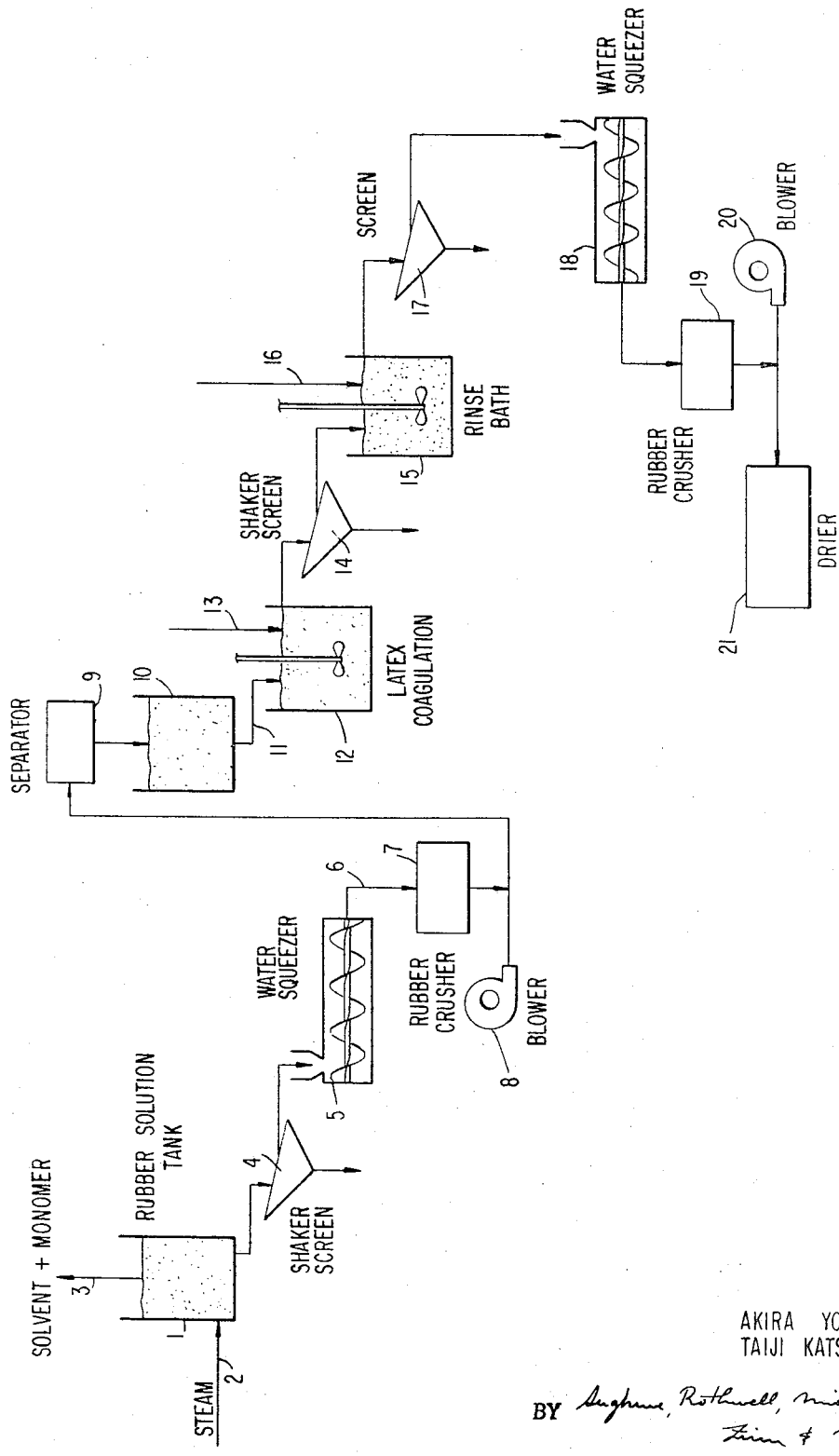

3,539,475
PROCESS FOR MANUFACTURE OF UNIFORM
RUBBER BLENDS OF DIFFERENT KINDS
Akira Yoshioka and Taiji Katsuyama, Tokuyama-shi, Japan, assignors to The Japanese Geon Co., Ltd., Tokyo, Japan
Filed July 28, 1967, Ser. No. 656,934
Claims priority, application Japan, Aug. 12, 1966, 41/52,637
Int. Cl. C08d 9/08
U.S. Cl. 260—4        5 Claims

ABSTRACT OF THE DISCLOSURE

A blend of two or more different type rubbers is produced using conventional type compounding machines. The first rubber component is prepared from a rubber solution, for example, a solution of polybutadiene rubber in benzene, coagulating by the introduction of steam to the solution, which also effects a simultaneous removal of the solvent, dewatering and crushing to a certain given degree of water content, generally from 2–35% by weight, and a particle size, generally 1–30 mm. in diameter to form porous rubber particles. The first rubber component in the form of porous particles thus prepared is then admixed with a latex of the second rubber component, at a temperature of 0–90° C., coagulated, dewatered and crushed, if desired, by a similar method to give a uniform rubber blend exhibiting excellent compounding ability or workability and superior physical properties after vulcanization.

BACKGROUND OF THE INVENTION

Field of the invention

The present invention relates to a process for the manufacture of uniform solid rubber blends. More particularly, it relates to a process whereby a uniform solid blend of different type rubbers is obtained from a solution of one type rubber and a latex of another type rubber.

Description of the prior art

The mixing of two different kinds of rubber has been hitherto carried out by mechanically mixing dried large blocks of each rubber component, in some cases together with various compounding ingredients using a Banbury mixer or a roll mill. However, such mixing often leads to difficulty in achieving uniform mixing, requires increased labor, prolongs work time and increases costs for attaining uniform mixing, due to the differences in the processability of the rubbers during blending.

A number of attempts have been made for obtaining uniform rubber blends during the steps of rubber production. One of them involves a process in which a rubber solution obtained by solution-polymerization (recovery of unreacted monomers is not always necessary) is incorporated with latex-instabilizers such as salts and acids. This solution is then homogeneously admixed with a rubber latex of a different kind, solvent is removed by the introduction of steam, coagulated and dried to give a uniform blend consisting of different type rubber. Japanese patent publication No. 24,378/65, equivalent to British Pat. No. 1,045,980 describes the rubber blend obtained in the above-mentioned process as having excellent dispersion capacity with reinforcing material, etc.; due to its capability of uniform mixing as compared to conventional mechanically blended products. The vulcanized products thereof also exhibit superior physical properties.

On the other hand, the foregoing process has the following difficulties and involves many problems in practice. The coagulation system in the solution polymerization is inevitably diluted with a large amount of water introduced by the mixing of a rubber latex with a rubber solution containing unreacted monomers and solvent, which results in the need of an excessive amount of steam for the recovery of unreacted monomer and solvent. In addition, large amounts of condensed water entrained into the monomer or solvent recovery system leads to the need for increased recovery capacity as compared to other processes, and the reuse solvent becomes difficult since the minor amount of unreacted monomer present in the latex (e.g., unreacted styrene in the case of SBR latex) is entrained in the solvent recovery system.

Furthermore, the presence of an acidic salt or acid, added as a latex-instabilizer along with a neutral salt for the purpose of preventing foaming in solvent recovery and controlling the particle size of rubber crumbs obtained after the coagulation, will result in apparatus corrosion problems when it is contacted with the hot acidic water formed by the introduction of steam during solvent recovery and coagulation of the rubber.

SUMMARY OF THE INVENTION

The present invention has its object in eliminating many defects that have occurred when making rubber blends by mechanically mixing large blocks of different types of rubbers.

We have found an improved process which comprises the steps of introducing steam to a rubber solution for the removal of solvent to form a coagulated rubber, dewatering the coagulated rubber to a water content of 2–35% by weight, crushing the dewatered coagulated rubber into particles of a size of 1–30 mm. in diameter, adding the crushed particles to a rubber latex of another type kept at a temperature of 30–90° C., mixing for at least one minute, coagulating the resultant rubber mixture, dewatering and finally drying to give a uniform blend of rubbers of two different types.

BRIEF DESCRIPTION OF THE DRAWING

FIG. 1 illustrates a preferred embodiment of the process of this invention.

DESCRIPTION OF THE PREFERRED EMBODIMENTS

According to the present invention, a rubber blend having uniform appearance, excellent physical properties and good processability is obtained without contamination by unreacted monomers, apparatus corrosion or loss of steam. Moreover, conventional recovery units for rubber solutions prepared by a solution polymerization process or for rubber latex can be used in the process for the same purposes without special modification.

The production of coagulated rubber from a rubber solution is carried out by introducing steam into a rubber solution formed after the termination of a polymerization reaction from which unreacted monomer may or may not have been recovered.

The coagulated rubber thus prepared is then dewatered in a water squeezer to a water content of 2–35% by weight (wet base), and crushed by a crusher into particles having a size of 1–30 mm. in diameter. Since the particles thus prepared have a porous surface which may be formed immediately after the removal of solvent, have an increased surface area due to the crushing operation and have been dewatered to a moderate extent, they will thus absorb water or emulsified rubber latex. These advantageous properties of the rubber can be enhanced by the addition of an aqueous solution of a surface active agent during the dewatering of the coagulated rubber to thereby attach the surface active agent to the rubber while facilitating uniform mixing with the latex in a later step. Typical surface active agents suited for use for such a purpose preferably include nonionic types such as polyethylene glycol sorbitan monostearate (Emasol 3112), polyethylene glycol monostearate (Emanon 3115) and the like.

Mixing of the crushed rubber particles with the latex is carried out at a latex temperature of between 30 and 90° C., preferably between the range of 50 and 70° C. At a temperature below 30° C., crushed rubber particles agglomerate into a viscous mass resulting in insufficient dispersion. At a temperature above 90° C., evaporation or water from the latex is so violent that efficient operation becomes impossible. Mixing must be conducted for at least one minute.

Recovery of solid rubber from the latex containing rubber particles may be carried out by conventional methods. For example, the latex containing rubber particles may be coagulated by the addition of coagulating agent, washed with water, screened to remove water, dewatered and then dried to give a solid rubber blend. Generally, a more uniform rubber compound is obtained by mechanical mixing imparted during the dewatering operation. The use of an extrusion type squeezer is desirable to dewater the rubber to a water content of from 2 to 35% by weight. In addition, further mixing is imparted by the extrusion squeezer to give a more uniform rubber compound. The dewatered rubber is then crushed into particles with a diameter of 1–30 mm. and finally subjected to uniform drying.

Overcoming the various difficulties encountered in mixing large blocks of two different kinds of dried rubber can be attained even when the above mechanical mixing operation at the dewatering stage has not been utilized.

The rubber latex and rubber solution to be employed in the practice of the present invention may contain, in either one or both of them, a rubber extending oil or reinforcing carbon black. Suitable rubber latexes to be used include for example, latices of butadiene-styrene rubber, butadiene-acrylonitrile rubber, natural rubber and chloroprene rubber.

Preferred rubber solutions to be used include for example, solutions of polybutadiene rubber, butadiene-styrene rubber, polyisoprene rubber, butyl rubber and ethylene-propylene rubber obtained by solution polymerization.

The invention is explained in more detail by referring to the attached drawing which illustrates a typical embodiment of the process of the invention. In the figure, steam is introduced through pipe 2 to rubber solution tank 1 to form a slurry of coagulated porous rubber crumbs accompanied by simultaneous recovery of solvent at pipe 3. In a preferred embodiment, the rubber solutions used are those formed immediately after the completion of solution polymerization. In this case, unreacted monomer may be recovered with the solvent. The rubber slurry thus obtained is freed from water at shaker screen 4, then passed to water squeezer 5, in which the rubber is dewatered from the initial water content of about 50% by weight to 2–35% by weight. The dewatered rubber is then passed through pipe 6 to rubber crusher 7 in which it is crushed to a particle size of about 1–30 mm. in diameter. The crushed rubber particles are then pneumatically transferred by blower 8 to separator 9 in which pneumatic air is vented off. The rubber particles are then dropped into tank 10, which has been charged with a rubber latex kept at a temperature of 30–90° C., and stirred. Since the solvent free rubber has been suitably dewatered, has a porous surface and has been crushed into small particles, it absorbs liquids well, so that stirring for at least one minute will effect sufficient penetration of the latex into the crushed rubber particles. This in turn, facilitates mixing of the two rubber components.

The addition of small amounts of suitable surface active agents, particularly nonionic surface active agents such as polyethylene glycol alkylate, to the rubber particles at the dewatering stage will enhance the mixing of both rubbers.

The mixture of rubbers obtained is then forwarded through pipe 11 to latex coagulation tank 12 and coagulated therein with a coagulating agent fed at pipe 13. The coagulation may be carried out by the use of conventional agents, such as salt for creaming and sulfuric acid for coagulation. The coagulated rubber is then subjected to conventional solid rubber producing operations. For instance, the coagulated rubber may be freed from water at shaker screen 14, rinsed in a bath 15 with water fed at pipe 16, freed from water again at screen 17 and passed to extrusion type water squeezer 18 to produce a rubber having a water content of 2–35% by weight. In the extrusion squeezer, further mechanical mixing is effected at the same time. The dewatered rubber blend so treated is then crushed in rubber crusher 19 to a particle size of 1–30 mm. in diameter and dispersed homogeneously into drier 21 by means of blower 20 to form a dried uniform rubber blend product.

The process of this invention will be illustrated by the following specific example.

EXAMPLE 1

The rubber solution used was polybutadiene solution in benzene which had been obtained directly after the polymerization of butadiene in benzene solvent in the presence of an alkyl aluminum-cobalt salt-type catalyst. The polybutadiene rubber consisted of 98.00% cis-1,4-structure, 1.43% trans-1,4-structure and 0.57% vinyl structure, and had a Mooney viscosity of 38.0 (ML 4, 100° C.).

The rubber latex was prepared in the following manner:

A butadiene-styrene mixture in a typical cold rubber recipe was emulsion-polymerized at 5° C. Unreacted monomers were removed after a chain stopper and antioxidant had been added to give an SBR latex having a solid rubber content of about 22% by weight, in which the proportion of butadiene to styrene was 75:25 by weight. To this SBR latex there was added a high aromatic oil in the proportion of 37.5 parts by weight per 100 parts of solid rubber content in the SBR latex to form an oil-extended SBR latex (the coagulation of this latex gives a solid rubber usually called SBR 1712). The Mooney viscosity of the oil-extended rubber was 50.

The mixing of the above rubber solution and rubber latex was carried out as follows:

To the above polybutadiene solution, which had just completed its polymerization reaction, were added a polymerization stopper and antioxidant, and steam was blown to remove unreacted monomers and solvent. The rubber slurry thus obtained was freed from water in a screen and squeezed in a rubber squeezer to a water content (web base) of 7%. The squeezed rubber was then crushed to a particle size of 1–5 mm. in diameter. At the same time, another sample was prepared by adding 0.5% by weight, based on rubber, of Emasol 3112 (a nonionic surface active agent comprising polyoxyethylene sorbitan monostearate) to the rubber prior to water squeezing.

The rubber particles thus formed were then admixed with the above-mentioned oil-extended SBR latex at a proportion equal to the solids content of the oil-extended rubber, and coagulated after being stirred for 10 minutes. A conventional coagulating operation was utilized for SBR latex which comprised first adding 7 parts by weight of sodium chloride per 100 parts SBR of a 22% salt solution to effect creaming, and then adding 2% sulfuric acid to effect coagulation at a pH of 2.5.

The rubber portion in the coagulated product was then separated by screen, washed with water, freed again from water and passed to an extrusion type rubber squeezer in which the rubber mixture was dewatered to the water content of 7% with a simultaneous further mixing of both rubber components. The rubber blend thus obtained was crushed in a rubber crusher to a particle size of 1–5 mm. and dried in an air drier.

Various samples were prepared as follows, and the characteristics of the rubber blends obtained in accordance with the process of this invention were compared with other samples obtained according to prior processes.

(1) Sample rubbers

Rubbers used for testing were as follows:

SAMPLE 1

A rubber blend was produced by the process of this invention with no surface active agent added prior to the dewatering of the solution rubber crumbs.

SAMPLE 2

A rubber blend was produced by the process of this invention with a surface active agent added prior to the dewatering of the solution rubber crumbs.

SAMPLE 3

A rubber blend was produced by an improved prior process in which a polybutadiene solution in benzene, after being freed from unreacted monomers, was mixed by stirring with an oil-extended SBR latex at a proportion of 1:1. The mixture was then coagulated by adding 5 parts by weight as pure sodium chloride of a 10% aqueous salt solution, and 1.5 parts by weight as pure sulfuric acid of a 2% sulfuric acid solution with homogeneous stirring. The solvent was then recovered by steam distillation and the rubber mixture was washed with water, dewatered and dried. The polybutadiene and oil-extended SBR were the same as those used in Samples 1 and 2.

SAMPLE 4

A rubber blend was prepared by kneading polybutadiene and an oil-extended SBR, each being separately dried and formulated.

(2) Compounding and kneading

Compounding was carried out using a recipe given in Table 1 by adding given amounts of compounding proportions of each agent. The kneading was conducted using a JIS compounding test roll of 6 inch diameter and 12 inch length by masticating at 50° C., for one minute, followed by kneading for one minute with the addition of the following kneading steps:

Catalin 8318 Resin and Staybelite Resin, kneading for 6 minutes at 112° C., kneading one minute with added NOBS #1; 8 minutes at 50° C., 10 minutes with the addition of carbon black, and kneading an additional two minutes after adding zinc oxide, sulfur and stearic acids. The blend was then subjected to cutting back and forth at ¾ over 3 times within 2 minutes and removed from the roll and subjected to thorough passing over 6 times within 2 minutes. After being allowed to stand for 2 hours, the rubber blend was wound on the roll and subjected to cut back at ¾ over 3 times, taken out as a sheet of 2.2 mm. in thickness, and allowed to cool for 4 hours to give vulcanizable samples.

TABLE 1

Compounding recipe:
Polybutadiene [1] _____ 50
Oil-extended SBR _____ 50
HAF carbon _____ 45
Catalin 8318 resin _____ 2.5
Staybelite resin _____ 2.5
Zinc oxide _____ 4
Stearic acid _____ 1
Sulfur _____ 1.7
NOBS #1 _____ 1.98

[1] Samples 1–3 were compounded using 400 g. of each of the blend rubbers, with Sample 4 being compounded by charging blocks of 200 g. of each of the rubbers at the same time.

(3) Results and evaluation (a) Roll milling property.—A tabulation of the milling properties of the samples resulted in the following order: 1=2>3>4. More particularly, Sample 4 has poor uniformity in roll banding performance, which is due to the difference in rolling tackiness between oil-extended SBR, which is very tacky to roll, and polybutadiene, which is apt to be stripped from the roll. On the other hand, Samples 1, 2 and 3 have excellent roll banding ability and exhibited superior operability and workability upon dispersion of compounding agents, with smoothness and luster on kneaded surfaces. Among these, Sample 3 exhibits such poor tackiness to roll as encountered with the use of polybutadiene alone. On the other hand, no such defect appears in Samples 1 and 2, which showed excellent workability upon mixing and kneading.

(b) Physical properties after vulcanization.—Vulcanization was conducted at 145° C., for 25, 50 and 100 minutes. These tests were conducted in accordance with JIS K6301 and the results are as shown in Table 2 below. Samples 1 and 2, produced according to the process of this invention, exhibited superior properties in comparison with any one of other samples prepared by conventional processes, especially with respect to tearing strength, as compared to mechanical mixing.

TABLE 2.—PROPERTIES OF RUBBER

|  | Non-vulcanized rubber | | | Butadiene-extended SBR | |
|---|---|---|---|---|---|
| Sample No. | 1 | 2 | 3 | 4 | 4 |
| Heat loss, percent | 0.06 | 0.10 | 0.10 | 0.07 | 0.11 |
| Organic acid, percent | 2.28 | 2.24 | 2.18 | _____ | 4.94 |
| Soap, percent | 0.12 | 0.15 | 0.11 | _____ | 0.21 |
| Oil content, percent | 12.91 | 12.93 | 12.90 | _____ | 26.05 |
| Mooney viscosity, ML4, 100° C. | 28.5 | 38.5 | 38.5 | 38.0 | 50.0 |
| Compound Mooney, ML4, 100° C. | 53.0 | 55.0 | 54.5 | 57.0 | |

Vulcanized rubber

| | | | | |
|---|---|---|---|---|
| Elongation at 50 min. vulcanization, percent | 415 | 408 | 400 | 397 |
| Tensile strength at 50 min. vulcanization, kg./cm.$^2$ | 209 | 208 | 202 | 200 |
| 300% modulus at 25 min. vulcanization kg./cm.$^2$ | 110 | 116 | 117 | 112 |
| 300% modulus at 50 min. vulcanization kg./cm.$^2$ | 135 | 130 | 137 | 143 |
| 300% modulus at 100 min. vulcanization kg./cm.$^2$ | 141 | 142 | 142 | 147 |
| Hardness, JIS | 65 | 66 | 65 | 65 |
| Tearing strength at 50 min. vulcanization, kg./cm. | 45.5 | 45.3 | 43.0 | 41.6 |

What is claimed is:

1. A process for the manufacture of a uniform solid rubber blend consisting of at least two different types of rubber from a solution of one rubber and a latex of another which comprises the steps of:
   (a) introducing steam to the rubber solution for the removal of solvent and to thereby form coagulated rubber;
   (b) dewatering to a water content of from about 2–35% by weight (wet base);
   (c) crushing to a particle size of from about 1–30 mm. in diameter;
   (d) adding the particles to the latex of another rubber maintained at about from 30–90° C.;
   (e) mixing for at least one minute;
   (f) coagulating the resultant mixture with a coagulating agent;
   (g) dewatering; and
   (h) drying.

2. A process as in claim 1 wherein a surface active agent of the nonionic type, is added to the coagulated rubber particles from the rubber solution before or after dewatering.

3. A process as in claim 2 wherein the rubber solution is formed immediately after the completion of solution polymerization and unreacted monomer is removed with the solvent.

4. A process as in claim 2 wherein the rubber solution includes at least one member from the group consisting of polybutadiene rubber, butadiene-styrene rubber, polyisoprene rubber, butyl rubber, and ethylenepropylene rubber obtained by solution polymerization.

5. A process as in claim 2 wherein the rubber latex includes at least one member from the group consisting of latices of butadiene-styrene rubber, butadiene-acrylonitrile rubber, natural rubber and chloroprene rubber.

References Cited

UNITED STATES PATENTS 3,304,281   2/1967   Tucker  260—33.6

FOREIGN PATENTS 702,841   1/1965   Canada.

SAMUEL H. BLECH, Primary Examiner

M. J. TULLY, Assistant Examiner

U.S. Cl. X.R.

260—29.7, 34.2, 41.5, 888, 889, 894